US012644744B2

(12) United States Patent
Hiramatsu et al.

(10) Patent No.: US 12,644,744 B2
(45) Date of Patent: Jun. 2, 2026

(54) MIST FLOW RATE MEASURING APPARATUS, ULTRASONIC ATOMIZATION SYSTEM, AND MIST FLOW RATE MEASURING METHOD

(71) Applicant: TOSHIBA MITSUBISHI-ELECTRIC INDUSTRIAL SYSTEMS CORPORATION, Tokyo (JP)

(72) Inventors: Takahiro Hiramatsu, Tokyo (JP); Hiroyuki Orita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 397 days.

(21) Appl. No.: 18/270,213

(22) PCT Filed: Nov. 26, 2021

(86) PCT No.: PCT/JP2021/043420
§ 371 (c)(1),
(2) Date: Jun. 29, 2023

(87) PCT Pub. No.: WO2023/095290
PCT Pub. Date: Jun. 1, 2023

(65) Prior Publication Data
US 2024/0102841 A1      Mar. 28, 2024

(51) Int. Cl.
*G01F 1/74* (2006.01)
*G01F 1/7086* (2022.01)

(52) U.S. Cl.
CPC ............. *G01F 1/74* (2013.01); *G01F 1/7086* (2013.01)

(58) Field of Classification Search
CPC .......... G01F 1/74; G01F 1/7086; G01F 1/704; B05B 17/0615
See application file for complete search history.

(56) References Cited

U.S. PATENT DOCUMENTS 4,914,955 A     4/1990   Stonestrom
6,640,649 B1   11/2003   Paz et al.
(Continued)

FOREIGN PATENT DOCUMENTS

CN          107949328 A      4/2018
JP          S55-077139 U     5/1980
(Continued)

OTHER PUBLICATIONS

Notice of Reasons for Refusal mailed on May 23, 2023, received for JP Application 2022-532017, 7 pages including English Translation.
(Continued)

*Primary Examiner* — Timothy P Graves
(74) *Attorney, Agent, or Firm* — XSENSUS LLP

(57)        ABSTRACT

In a mist flow rate measuring apparatus of the present disclosure, in a transparent pipe, a camera executes imaging processing of reflected light, the imaging processing having at least a part of a mist flowing region through which a mist-containing gas flows set as an imaging target region, and acquires imaging information. A mist flow rate calculation unit executes mist flow rate calculation processing based on the imaging information. The mist flow rate calculation processing includes sum value calculation processing of obtaining a luminance sum value, which is a sum of a plurality of luminance values indicated by the imaging information, and flow rate derivation processing of deriving the flow rate of the raw material mist from the luminance sum value.

12 Claims, 14 Drawing Sheets

(56) References Cited

U.S. PATENT DOCUMENTS

| | | |
|---|---|---|
| 2017/0035342 A1 | 2/2017 | Elia et al. |
| 2019/0128718 A1 | 5/2019 | McConkey |
| 2022/0349738 A1 | 11/2022 | Meribout et al. |
| 2024/0102841 A1 | 3/2024 | Hiramatsu et al. |

FOREIGN PATENT DOCUMENTS

| | | | | |
|---|---|---|---|---|
| JP | H09-33419 | A | 2/1997 | |
| JP | 2007-021608 | A | 2/2007 | |
| JP | 2009240898 | A * | 10/2009 | |
| JP | 2011155081 | A * | 8/2011 | |
| JP | 6158336 | B2 | 7/2017 | |
| KR | 101978351 | B1 * | 5/2019 | ............ G01F 23/02 |
| WO | 2017/069204 | A1 | 4/2017 | |

OTHER PUBLICATIONS

International Search Report and Written Opinion mailed on Jan. 18, 2022, received for PCT Application PCT/JP2021/043420, filed on Nov. 26, 2021, 8 pages including English Translation.
Office Action issued on Feb. 5, 2025, in corresponding Korean patent Application No. 10-2023-7019095, 9 pages.
Office Action issued on Feb. 5, 2025, in Korean patent Application No. 10-2023-7019112, 9 pages.
Office Action issued on Jun. 8, 2023, in corresponding Taiwanese patent Application No. 111141615, 13 pages.
Office Action issued on Oct. 23, 2025, in related U.S. Appl. No. 18/270,211, 63 pages.
Notice of Reasons for Refusal mailed on May 23, 2023, received for JP Application 2022-532109, 7 pages including English Translation.
International Search Report and Written Opinion mailed on Jan. 18, 2022, received for PCT Application PCT/JP2021/043422, filed on Nov. 26, 2021, 8 pages including English Translation.
Office Action issued on Aug. 9, 2025, in corresponding Chinese patent Application No. 202180083210.X, 31 pages.

\* cited by examiner

| | 1 | 2 | 3 | 4 | 5 | 6 | 7 | 8 | ⋯ | N |
|---|---|---|---|---|---|---|---|---|---|---|
| 1 | 108 | 135 | 169 | 211 | 198 | 233 | 229 | 183 | ⋯ | 117 |
| 2 | 113 | 141 | 177 | 221 | 213 | 215 | 227 | 182 | ⋯ | 116 |
| 3 | 110 | 138 | 172 | 215 | 211 | 216 | 220 | 176 | ⋯ | 113 |
| 4 | 114 | 142 | 178 | 222 | 217 | 219 | 220 | 176 | ⋯ | 113 |
| 5 | 108 | 135 | 169 | 211 | 209 | 225 | 219 | 175 | ⋯ | 112 |
| 6 | 118 | 147 | 184 | 230 | 216 | 219 | 211 | 169 | ⋯ | 108 |
| 7 | 109 | 136 | 170 | 212 | 203 | 216 | 227 | 182 | ⋯ | 116 |
| 8 | 102 | 127 | 159 | 199 | 213 | 218 | 219 | 175 | ⋯ | 112 |
| ⋮ | ⋮ | ⋮ | ⋮ | ⋮ | ⋮ | ⋮ | ⋮ | ⋮ | | ⋮ |
| M | 115 | 144 | 180 | 225 | 226 | 233 | 221 | 177 | ⋯ | 113 |

F I G. 11
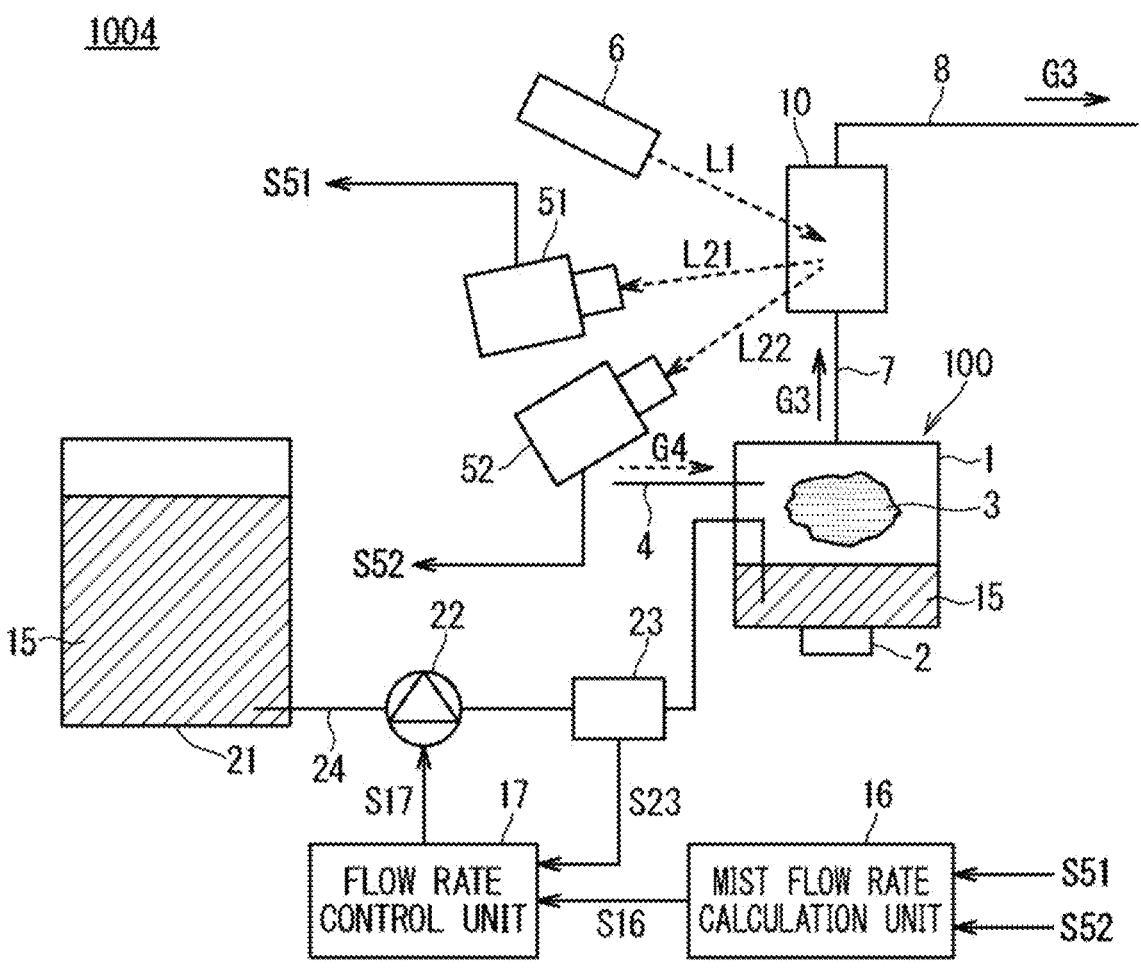

F I G . 15
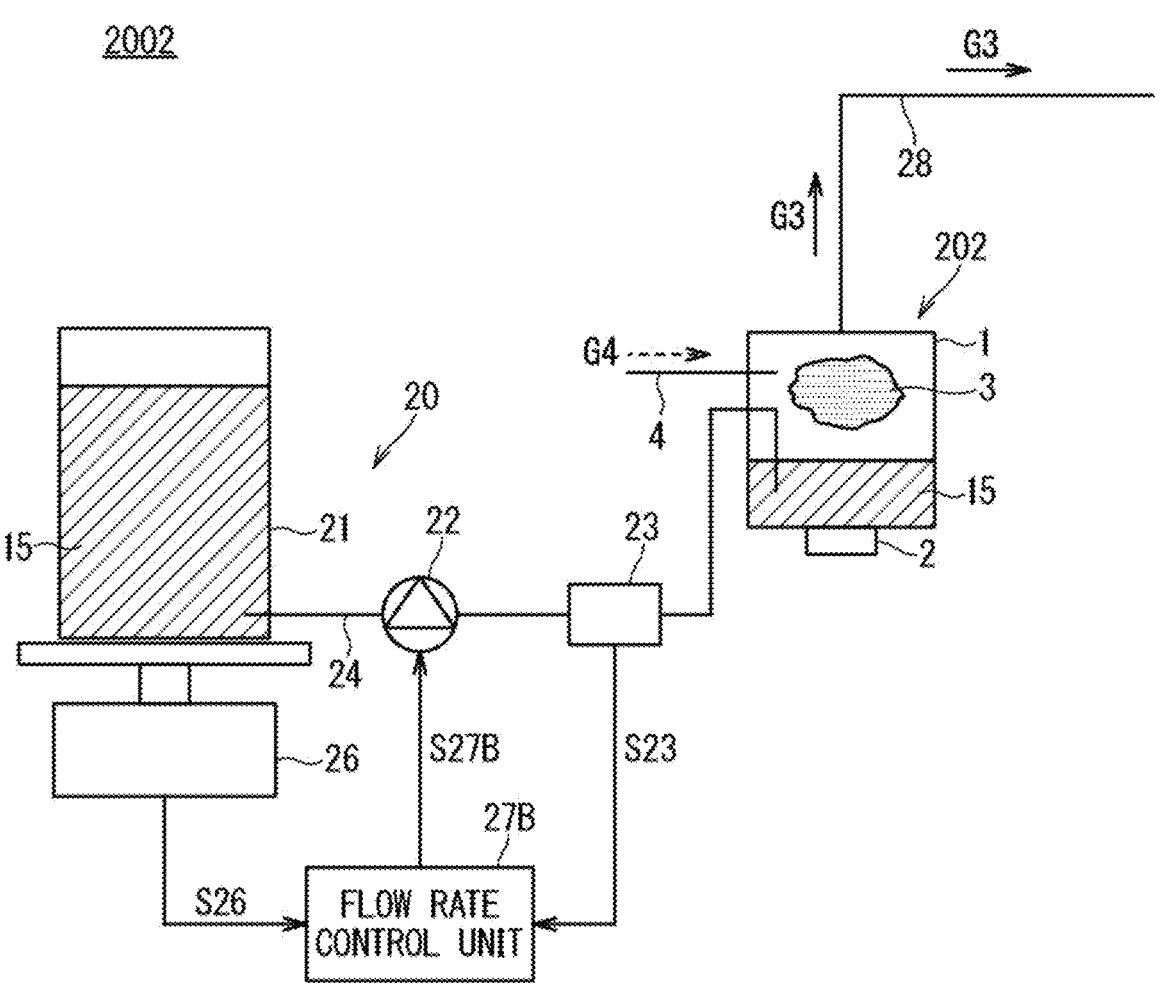

MIST FLOW RATE MEASURING APPARATUS, ULTRASONIC ATOMIZATION SYSTEM, AND MIST FLOW RATE MEASURING METHOD

CROSS-REFERENCE TO RELATED APPLICATIONS

The present application is based on PCT filing PCT/JP2021/043420, filed Nov. 26, 2021, the entire contents of which are incorporated herein by reference. This application is also related to U.S. patent application Ser. No. 18/270,211, entitled MIST FLOW RATE MEASURING APPARATUS, filed Jun. 29, 2023.

TECHNICAL FIELD

The present invention relates to a mist flow rate measuring apparatus that measures a flow rate of a raw material mist under a situation where a mist-containing gas containing the raw material mist flows.

BACKGROUND ART

Conventionally, a method of measuring the flow rate of the mist contained in the mist-containing gas has not been established, and the flow rate of the mist has been indirectly measured by measuring an amount of consumption of a raw material solution in a liquid form before the solution turns into mist.

FIG. 14 is an explanatory view showing a configuration (part 1) of a conventional ultrasonic atomization system. As shown in FIG. 14, a conventional ultrasonic atomization system 2001 includes an ultrasonic atomization apparatus 201, a raw material solution supply unit 20, and a flow rate control unit 27 as main constituent elements.

The ultrasonic atomization apparatus 201 includes an atomization container 1, a liquid level position detection sensor 25, and an ultrasonic transducer 2 as main constituent elements.

A raw material solution 15 is accommodated in the atomization container 1. A predetermined number of the ultrasonic transducers 2 (only one is shown in FIG. 14) are disposed on the bottom surface of the atomization container 1.

In the ultrasonic atomization apparatus 201 thus configured, when the ultrasonic transducer 2 executes ultrasonic vibration processing for applying ultrasonic vibration, vibration energy of the ultrasonic wave is transmitted to the raw material solution 15 in the atomization container 1 via the bottom surface of the atomization container 1.

Then, the raw material solution 15 turns into mist having a particle size of 10 μm or less, thereby a raw material mist 3 is obtained in the atomization container 1.

A carrier gas G4 is supplied from the gas supply pipe 4 into the atomization container 1. The carrier gas G4 is supplied into the atomization container 1 at a predetermined flow rate in order to convey a raw material mist 3 to a mist utilization processing unit outside the ultrasonic atomization apparatus 201 via a mist gas pipe 28.

As a result, a mist-containing gas G3 containing the raw material mist 3 is conveyed to the outside in the mist gas pipe 28.

The atomization container 1 includes a liquid level position detection sensor 25 therein. The liquid level position detection sensor 25 is a sensor that can detect a liquid level height position of the raw material solution 15. A part of the liquid level position detection sensor 25 is immersed in the raw material solution 15. The liquid level position detection sensor 25 detects the position of a liquid level 15a of the raw material solution 15, and obtains sensor information S25 indicating the detected position of the liquid level 15a.

The raw material solution supply unit 20 includes a container 21, a pump 22, a flow meter 23, and a raw material solution supply side pipe 24 as main constituent elements. The container 21 contains the raw material solution 15. The flow meter 23 measures the flow rate flowing through the raw material solution supply side pipe 24, and obtains measured flow rate information S23 indicating the measured flow rate.

The flow rate control unit 27 receives the measured flow rate information S23 from the flow meter 23, and receives the sensor information S25 from the liquid level position detection sensor 25.

The flow rate control unit 27 constantly recognizes the flow rate of the raw material solution flowing through the raw material solution supply side pipe 24 by the measured flow rate indicated by the measured flow rate information S23.

The flow rate control unit 27 constantly recognizes an amount of change of the raw material solution 15 in the atomization container 1 from the position of the liquid level 15a of the raw material solution 15 indicated by the sensor information S25.

Based on the measured flow rate information S23 and the sensor information S25, the flow rate control unit 27 executes raw material supply control processing of outputting a pump drive signal S27 instructing a driving amount of the pump 22 so as to satisfy a flow rate control condition to be described later.

The above-described flow rate control condition is a condition that "the position of the liquid level 15a of the raw material solution 15 indicated by the sensor information S25 is within an allowable range from a predetermined liquid level height".

In the conventional ultrasonic atomization system 2001, a first flow rate estimation method is adopted in which the amount of change of the raw material solution 15 in the atomization container 1 from the predetermined liquid level is recognized from the sensor information S25 obtained from the liquid level position detection sensor 25, and the flow rate of the raw material mist 3 contained in the mist-containing gas G3 is estimated from the recognized amount of change of the raw material solution 15.

FIG. 15 is an explanatory view showing a configuration (part 2) of a conventional ultrasonic atomization system. As shown in FIG. 15, a conventional ultrasonic atomization system 2002 includes an ultrasonic atomization apparatus 202, a raw material solution supply unit 20, a weighing meter 26, and a flow rate control unit 27B as main constituent elements.

Hereinafter, the same constituent elements as those of the ultrasonic atomization system 2001 shown in FIG. 14 are denoted by the same reference numerals, the description thereof are omitted as appropriate, and feature portions of the ultrasonic atomization system 2002 are mainly described.

The ultrasonic atomization apparatus 202 includes an atomization container 1 and an ultrasonic transducer 2 as main constituent elements. The ultrasonic atomization apparatus 202 is different from the ultrasonic atomization apparatus 201 in that the liquid level position detection sensor 25 is not provided.

The raw material solution supply unit 20 includes a container 21, a pump 22, a flow meter 23, and a raw material solution supply side pipe 24 as main constituent elements. The raw material solution supply unit 20 supplies a raw material solution 15 to the ultrasonic atomization apparatus 202.

In the raw material solution supply unit 20, the container 21 stores the raw material solution 15. The flow meter 23 measures the flow rate flowing through the raw material solution supply side pipe 24, and obtains measured flow rate information S23 indicating the measured flow rate.

The weighing meter 26 supports the container 21 in a manner that the weight of the container can be measured. The weighing meter 26 measures the weight of the container 21 containing the raw material solution 15 and outputs a weighing signal S26 indicating the weight.

The flow rate control unit 27B receives the measured flow rate information S23 from the flow meter 23, and receives the weighing signal S26 from the weighing meter 26.

The flow rate control unit 27B constantly recognizes the flow rate of the raw material solution flowing through the raw material solution supply side pipe 24 by the measured flow rate indicated by the measured flow rate information S23.

The flow rate control unit 27B constantly recognizes the remaining amount of the raw material solution 15 in the container 21 from the weight of the container 21 indicated by the weighing signal S26.

Based on the measured flow rate information S23 and the weighing signal S26, the flow rate control unit 27B executes the raw material supply control processing of outputting a pump drive signal S27B instructing a driving amount of the pump 22 so as to satisfy the flow rate control condition to be described later.

The above-described flow rate control condition is a condition that "an amount of change per unit time of the weight indicated by the weighing signal S26 is within an allowable range".

In the conventional ultrasonic atomization system 2002, the amount of change of the raw material solution 15 in the container 21 is recognized from the weighing signal S26 obtained by the weighing meter 26. Then, the ultrasonic atomization system 2002 adopts a second flow rate estimation method of estimating the flow rate of a raw material mist 3 contained in a mist-containing gas G3 from the amount of change of the raw material solution 15 in the container 21.

The second flow rate estimation method is used in, for example, the atomization apparatus disclosed in Patent Document 1.

PRIOR ART DOCUMENT

Patent Document

Patent Document 1: Japanese Patent No. 6158336

SUMMARY

Problem to be Solved by the Invention

However, the conventional first and second flow rate estimation methods indirectly obtain the flow rate of the raw material mist 3 based on the amount of change of the raw material solution 15 in the atomization container 1 or the amount of change of the raw material solution 15 in the container 21.

For this reason, in the conventional flow rate measuring method of the raw material mist 3, the following estimation error factors (1) and (2) occur.

(1) There is a time lag between the flow of the mist-containing gas G3 containing the raw material mist 3 and the timing of consuming the raw material solution 15.

(2) When the atomization efficiency of turning the raw material mist 3 into a mist from the raw material solution 15 becomes lower than that at the time of setting, the deviation of the estimated flow rate from the true flow rate of the raw material mist 3 increases by the amount of the decrease.

As described above, the conventional method for measuring the flow rate of the raw material mist 3 including the first and second flow rate estimation methods has a problem that the flow rate of the raw material mist 3 cannot be accurately measured because of the above-described estimated error factors.

An object of the present disclosure is to provide a mist flow rate measuring apparatus that can solve the above-described problems and accurately obtain the flow rate of the raw material mist.

Means to Solve the Problem

A mist flow rate measuring apparatus of the present disclosure includes: a mist imaging camera that executes imaging processing with at least a part of a mist flowing region through which a mist-containing gas containing a raw material mist flows set as an imaging target region to acquire imaging information; and a mist flow rate calculation unit that executes mist flow rate calculation processing of obtaining a flow rate of the raw material mist in the mist-containing gas based on the imaging information, in which the imaging information indicates a plurality of luminance values in a plurality of pixels corresponding to the imaging target region.

Effects of the Invention

The mist flow rate calculation unit in the mist flow rate measuring apparatus of the present disclosure executes the mist flow rate calculation processing based on the imaging information indicating the plurality of luminance values corresponding to the imaging target region.

Because there is a certain correlation between the flow rate of the raw material mist and the plurality of luminance values, a correlation parameter for deriving the flow rate of the raw material mist from the plurality of luminance values can be acquired in advance.

As a result, the mist flow rate measuring apparatus of the present disclosure can accurately obtain the flow rate of the raw material mist by executing the mist flow rate calculation processing using the correlation parameter based on the imaging information.

The objects, features, aspects, and advantages of the present invention will become more apparent from the following detailed description and the accompanying drawings.

BRIEF DESCRIPTION OF DRAWINGS

FIG. 3 is an explanatory view showing an example of imaging information of the camera shown in FIG. 1.

FIG. 11 is an explanatory view showing a configuration of an ultrasonic atomization system according to a fourth embodiment of the present disclosure.

FIG. 15 is an explanatory view showing a configuration (part 2) of a conventional ultrasonic atomization system.

DESCRIPTION OF EMBODIMENTS

First Embodiment

Figure 1:
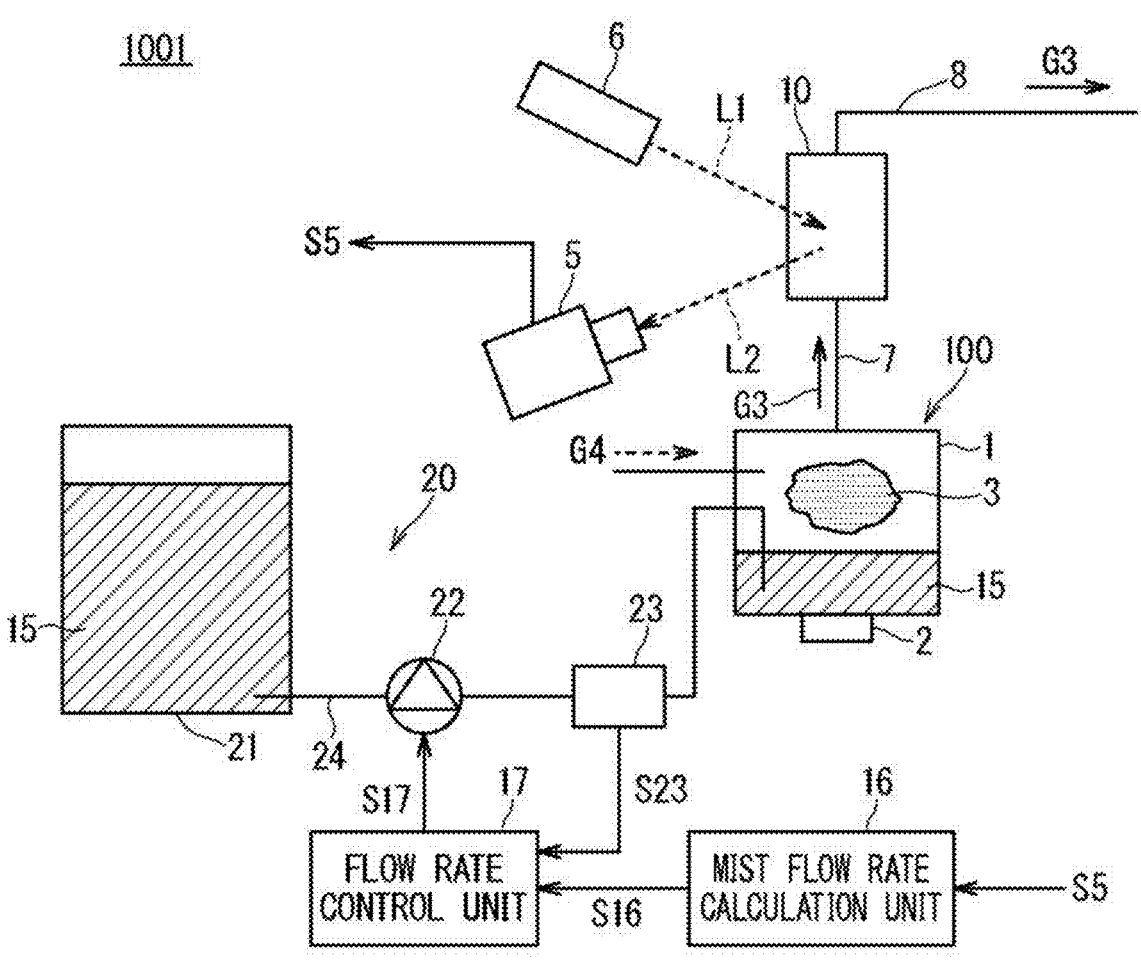
FIG. 1 is an explanatory view showing a configuration of an ultrasonic atomization system according to a first embodiment of the present disclosure.

FIG. 1 is an explanatory view showing a configuration of an ultrasonic atomization system 1001 according to a first embodiment of the present disclosure. The ultrasonic atomization system 1001 includes a mist flow rate measuring apparatus of the first embodiment. The mist flow rate measuring apparatus of the first embodiment includes a camera 5, a light source 6, a transparent pipe 10, and a mist flow rate calculation unit 16 as main constituent elements.

As shown in FIG. 1, the ultrasonic atomization system 1001 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

The upstream pipe 7, the transparent pipe 10, and the downstream pipe 8 are coupled to each other, and the combination of the pipes 7, 10, and 8 constitutes an external discharge pipe for a mist-containing gas G3. The upstream pipe 7 serves as a first gas supply pipe, the downstream pipe 8 serves as a second gas supply pipe, and the transparent pipe 10 serves as an imaging pipe.

The ultrasonic atomization apparatus 100 includes an atomization container 1 and an ultrasonic transducer 2 as main constituent elements.

A raw material solution 15 is accommodated in the atomization container 1. A predetermined number of the ultrasonic transducers 2 (only one is shown in FIG. 1) are disposed on the bottom surface of the atomization container 1. As the raw material solution 15, for example, a material solution containing a metal element such as aluminum (Al) or zinc (Zn) are possible.

In the ultrasonic atomization apparatus 100 thus configured, when the ultrasonic transducer 2 executes ultrasonic vibration processing for applying ultrasonic vibration, vibration energy of the ultrasonic wave is transmitted to the raw material solution 15 in the atomization container 1 via the bottom surface of the atomization container 1.

Then, the raw material solution 15 turns into mist having a particle size of 10 μm or less, thereby a raw material mist 3 is obtained in the atomization container 1.

Meanwhile, a carrier gas G4 is supplied from a gas supply pipe 4 into the atomization container 1. The carrier gas G4 is supplied into the atomization container 1 at a predetermined flow rate in order to convey the raw material mist 3 in the atomization container 1 to a mist utilization processing unit outside the ultrasonic atomization apparatus 100 via the external discharge pipe such as the upstream pipe 7. As the carrier gas G4, for example, a high concentration inert gas can be adopted.

As a result, the mist-containing gas G3 containing the raw material mist 3 propagates in the external discharge pipe including a combination of the upstream pipe 7, the transparent pipe 10, and the downstream pipe 8, and is finally supplied to the outside. The mist-containing gas G3 means a gas in a state where the raw material mist 3 is conveyed by the carrier gas G4.

The raw material solution supply unit 20 includes a container 21, a pump 22, a flow meter 23, and a raw material solution supply side pipe 24 as main constituent elements. The container 21 contains the raw material solution 15. The flow meter 23 measures the flow rate flowing through the raw material solution supply side pipe 24, and obtains measured flow rate information S23 indicating the measured flow rate.

As described above, the mist-containing gas G3 containing the raw material mist 3 is supplied to the outside from the atomization container 1 via the upstream pipe 7, the transparent pipe 10, and the downstream pipe 8. Each of the upstream pipe 7, the transparent pipe 10, and the downstream pipe 8 serves as a flow path of the mist-containing gas G3 in the inside thereof. That is, each of the upstream pipe 7 and the downstream pipe 8 has a mist flowing region therein.

As described above, the ultrasonic atomization apparatus 100 performs the ultrasonic vibration processing on the raw material solution 15 by the ultrasonic transducer 2 to generate the raw material mist 3, and causes the carrier gas G4 to flow the mist-containing gas G3 into the mist flowing region.

In the mist flow rate measuring apparatus of the first embodiment, a part of the mist flowing region in the transparent pipe 10, which is an imaging pipe, is an imaging target region of the camera 5 which is a mist imaging camera.

The light source 6 irradiates the imaging target region in the transparent pipe 10 with incident light L1. Then, the incident light L1 is reflected in the imaging target region of the mist-containing gas G3, and reflected light L2 is obtained.

Then, the camera 5, which is the mist imaging camera, executes imaging processing of imaging the reflected light L2. That is, the imaging processing by the camera 5 is imaging processing on the reflected light L2, the processing having at least a part of the mist flowing region where the mist-containing gas G3 including the raw material mist 3 flows set as the imaging target region.

The camera 5 executes the imaging processing to acquire imaging information S5. The imaging information S5 indicates a plurality of luminance values in a plurality of pixels corresponding to the imaging target region.

Figure 2:
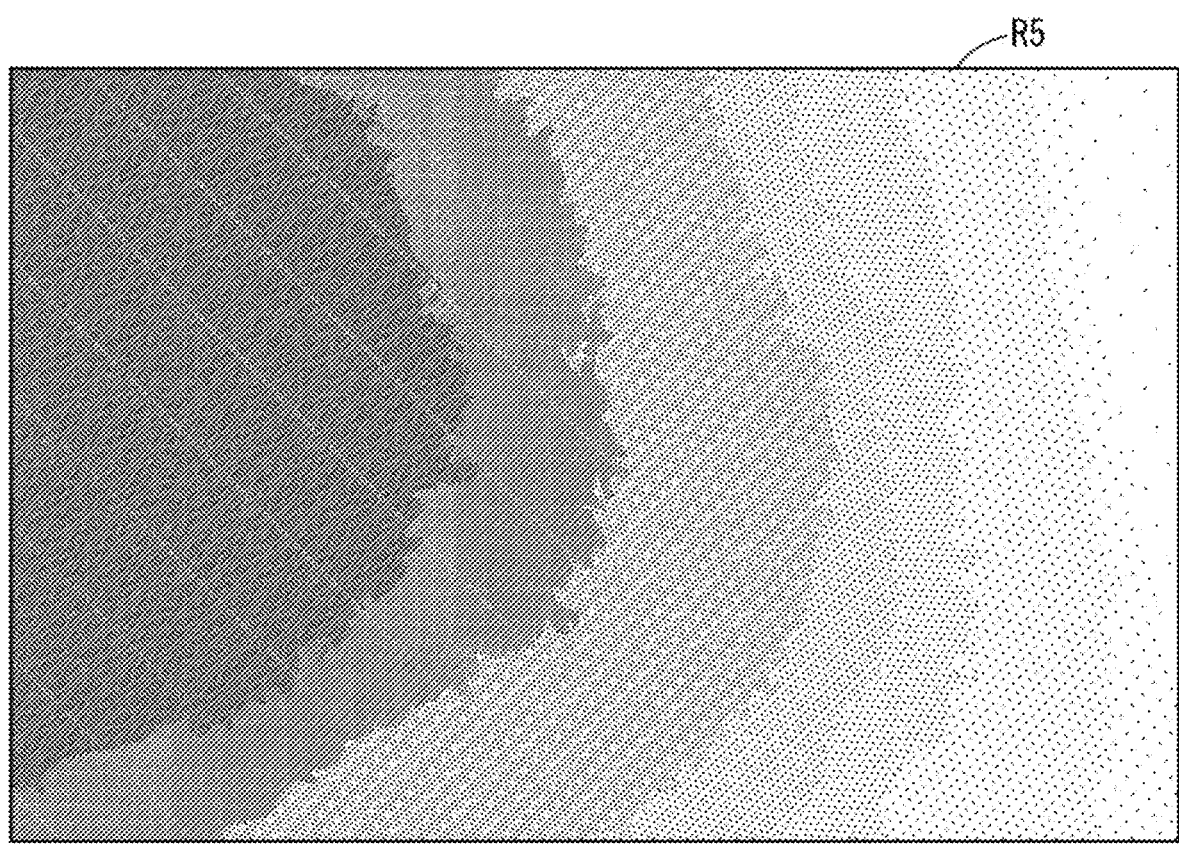
FIG. 2 is an explanatory view showing an example of an imaging result by a camera shown in FIG. 1.

FIG. 2 is an explanatory view showing an example of an imaging result by the camera 5. FIG. 3 is an explanatory view showing an example of the imaging information S5.

When the camera 5 executes the imaging processing of imaging the reflected light L2, the imaging result in an imaging target region R5 is obtained as shown in FIG. 2. In the imaging target region R5, a black region having a high density indicates a state in which luminance is higher than that in a black region having a low density.

The camera 5 executes internal calculation processing from the imaging result as shown in FIG. 2 to obtain the imaging information S5 as shown in FIG. 3.

In the imaging information S5, as shown in FIG. 3, a plurality of pixels arranged in a matrix of N ($\geq$2)×M ($\geq$2) corresponds to the imaging target region R5, and each of the plurality of pixels has a luminance value. FIG. 3 shows that the larger the luminance value indicated by the pixel, the higher the luminance.

As described above, the imaging information S5 is information indicating the plurality of luminance values in the plurality of pixels. Note that the imaging result shown in FIG. 2 and the imaging information S5 shown in FIG. 3 are merely examples, and there is no correlation therebetween.

The mist flow rate calculation unit 16 executes mist flow rate calculation processing of obtaining the flow rate of the raw material mist 3 in the mist-containing gas G3 based on the imaging information S5 obtained from the camera 5, and obtains mist flow rate information S16 indicating the flow rate of the raw material mist 3. The mist flow rate information S16 is given to the flow rate control unit 17.

The mist flow rate calculation processing by the mist flow rate calculation unit 16 includes sum value calculation processing and flow rate derivation processing described below.

Sum value calculation processing . . . Processing of obtaining a luminance sum value, which is a sum of the plurality of luminance values indicated by the imaging information S5

Flow rate derivation processing . . . Processing of deriving the flow rate of raw material mist 3 from the luminance sum value obtained by the sum value calculation processing As described above, the mist flow rate calculation unit 16 executes the mist flow rate calculation processing including the sum value calculation processing and the flow rate derivation processing based on the plurality of luminance values indicated by the imaging information S5.

Figure 4:
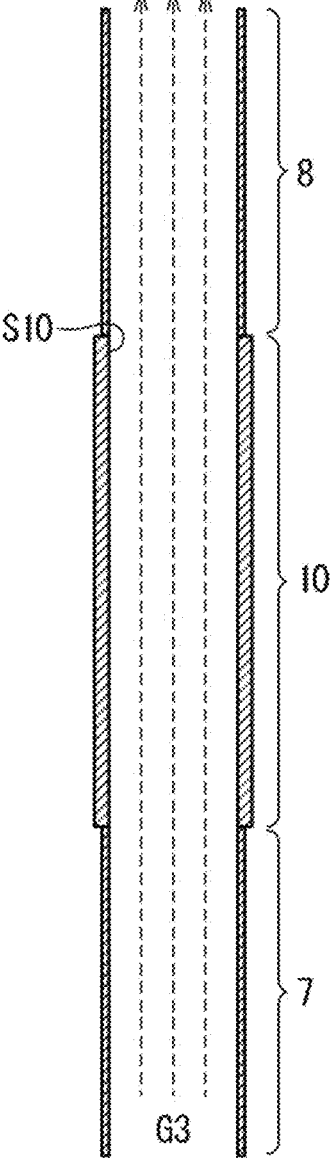
FIG. 4 is an explanatory view showing a cross-sectional structure of an upstream pipe, a transparent pipe, and a downstream pipe shown in FIG. 1.
Figure 4:
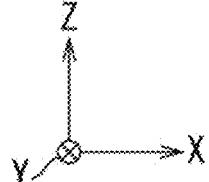

FIG. 4 is an explanatory view showing a cross-sectional structure of the upstream pipe 7, the transparent pipe 10, and the downstream pipe 8. In FIG. 4, an XYZ orthogonal coordinate system is shown.

As shown in the drawing, the upstream pipe 7, the transparent pipe 10, and the downstream pipe 8 constituting the external discharge pipe are disposed along the Z direction parallel to the vertical direction, and the upstream pipe 7 and the transparent pipe 10, and the transparent pipe 10 and the downstream pipe 8, are respectively coupled to each other.

Therefore, the mist-containing gas G3 supplied from the ultrasonic atomization apparatus 100 flows inside each of the upstream pipe 7, the transparent pipe 10, and the downstream pipe 8 along the +Z direction. In other words, a flow path of the mist-containing gas G3 is provided in each of the upstream pipe 7, the transparent pipe 10, and the downstream pipe 8. The cross-sectional shape of each of the upstream pipe 7, the transparent pipe 10, and the downstream pipe 8 is a circular shape having a constant inner diameter, and the inner diameters of the upstream pipe 7, the transparent pipe 10, and the downstream pipe 8 are set to be equal to each other.

A constituent material of the transparent pipe 10, which is the imaging pipe, has transparency. Further, a constituent material of a pipe inner surface S10 of the transparent pipe 10 has hydrophilicity. Note that the thickness of each of the upstream pipe 7, the transparent pipe 10, and the downstream pipe 8 is optionally set.

Figure 5:
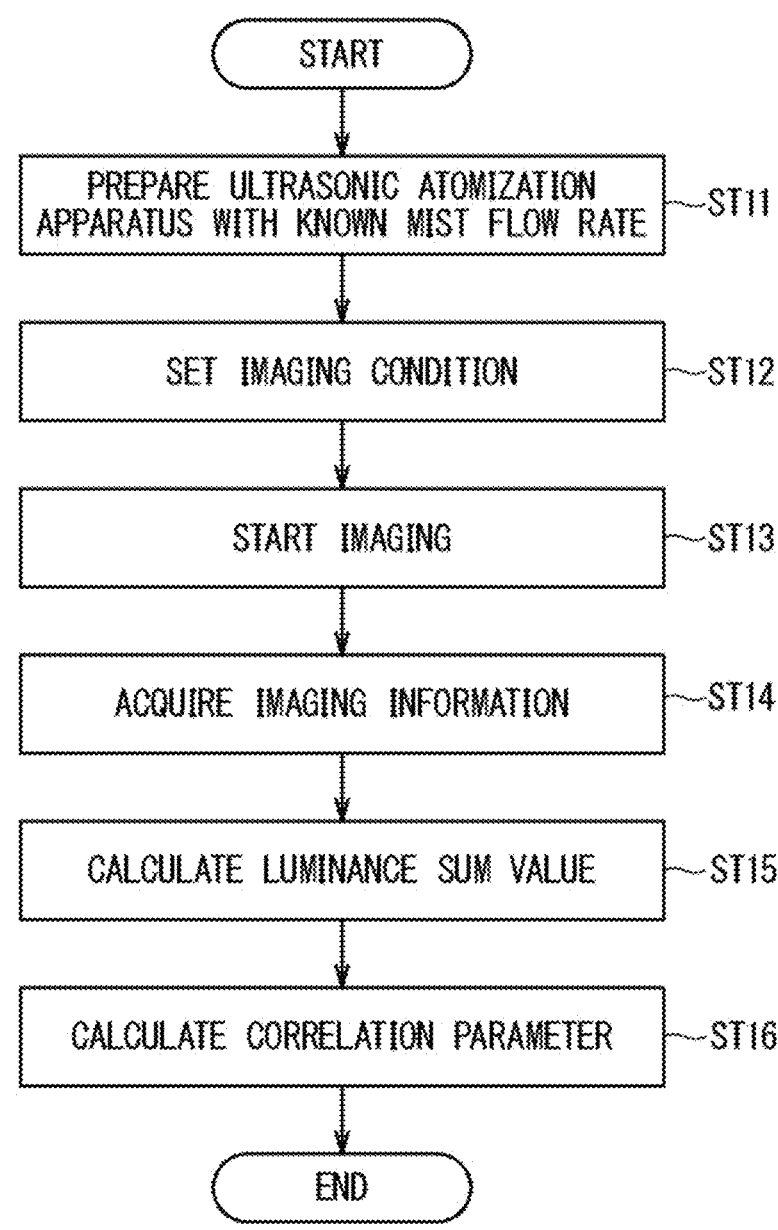
FIG. 5 is a flowchart showing a processing procedure of calculating a correlation parameter.

FIG. 5 is a flowchart showing a processing procedure of calculating a correlation parameter for obtaining the flow rate of the raw material mist 3. The calculation processing of the correlation parameter is performed prior to the actual operation of the mist flow rate measuring apparatus of the first embodiment.

Referring to the drawing, in step ST11, a predetermined ultrasonic atomization apparatus having a known flow rate of the raw material mist 3 is prepared. Here, a flow rate value of the raw material mist 3 is defined as a mist flow rate MF.

Then, in step ST12, an imaging condition by the camera 5 is set. This imaging condition is the same as an imaging condition of the camera 5 during the actual operation of the mist flow rate measuring apparatus of the first embodiment. Note that the camera 5 is a camera for the mist flow rate measuring apparatus of the first embodiment.

The imaging condition possibly includes, for example, an amount of light and wavelength of the light source 6, an angle of irradiating the transparent pipe 10 with the incident light L1, an imaging position of the camera 5, an imaging target region, an imaging light type (reflected light or transmitted light), and the like. Note that the flow rate of the carrier gas G4 in the predetermined ultrasonic atomization apparatus is desirably set to be the same as the flow rate of the carrier gas G4 in the ultrasonic atomization apparatus 100.

Thereafter, in step ST13, the imaging processing by the camera 5 is started, and in step ST14, the camera 5 executes the imaging processing on the reflected light L2 to acquire the imaging information S5.

Then, in step ST15, the luminance sum value that is the sum of the plurality of luminance values indicated by the imaging information S5 is calculated. Here, it is assumed that a luminance sum value LS is calculated.

Thereafter, in step ST16, a correlation parameter K1 is calculated. The mist flow rate MF and the luminance sum value LS have a certain correlation. For example, it is assumed that there is a relationship in which the mist flow rate MF is expressed as a linear function of the luminance sum value LS as shown in Expression (1).

$$MF = K1 \cdot LS + c1 \tag{1}$$

where c1 is a constant.

In this case, the correlation parameter K1 can be calculated from the following Expression (2) based on Expression (1).

$$K1 = (MF - c1)/LS \tag{2}$$

As described above, the correlation parameter K1 that can be calculated by the flow shown in FIG. 5 can be prepared in advance for the mist flow rate measuring apparatus of the first embodiment.

Figure 6:
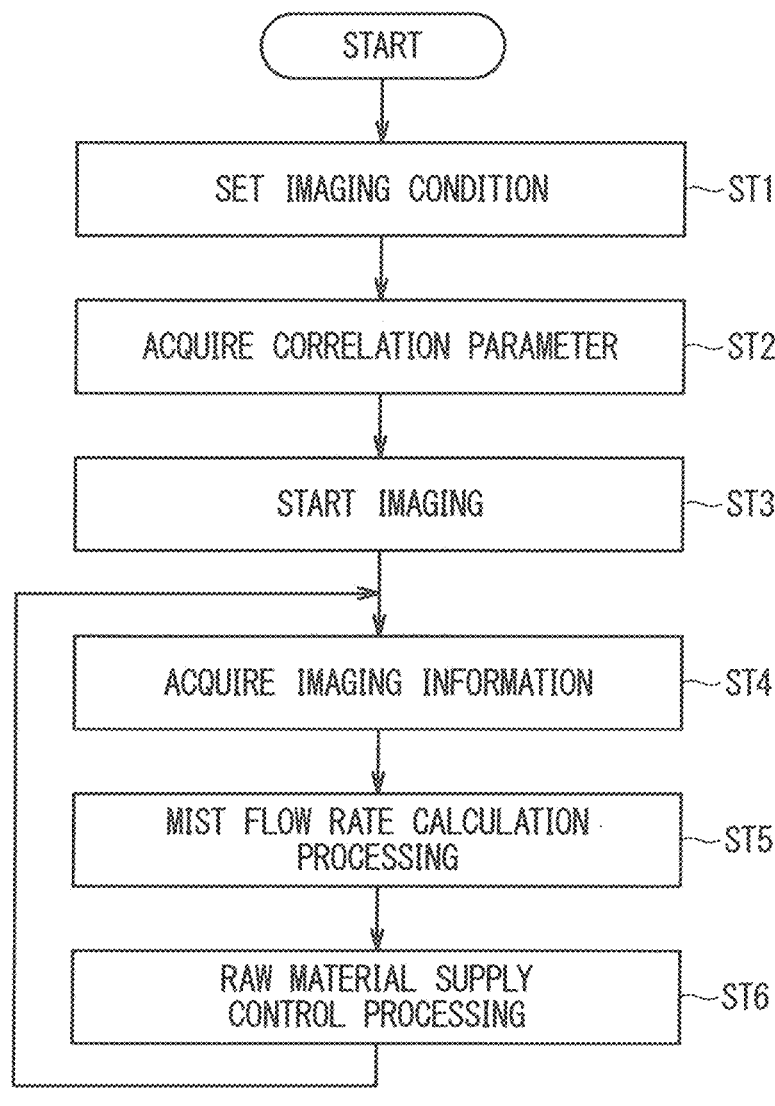
FIG. 6 is a flowchart showing a processing procedure of a method of controlling a raw material solution in the ultrasonic atomization system of the first embodiment.

FIG. 6 is a flowchart showing a processing procedure of a method of controlling the raw material solution 15 in the ultrasonic atomization system of 1001 shown in FIG. 1. This flow includes a mist flow rate measuring method by the mist flow rate measuring apparatus of the first embodiment. Hereinafter, control contents of the ultrasonic atomization system 1001 are described with reference to the drawing.

First, in step ST1, the imaging condition in the mist flow rate measuring apparatus of the first embodiment is set. Here, the imaging condition has the same contents as those at the time of calculating the correlation parameter K1 shown in FIG. 5.

Next, in step ST2, the mist flow rate calculation unit 16 acquires the correlation parameter K1. As a method for acquiring the correlation parameter K1, for example, a method can be used in which the correlation parameter K1 is stored in an external storage apparatus (not shown) and the mist flow rate calculation unit 16 acquires the correlation parameter K1 as necessary.

As described above, step ST2 is a step of acquiring the correlation parameter K1 for deriving the mist flow rate MF from the luminance sum value of the plurality of luminance values.

Thereafter, in step ST3, the mist flow rate measuring apparatus of the first embodiment starts the imaging processing on the reflected light L2 by the camera 5, and in step ST4, the camera 5 executes the imaging processing on the reflected light L2 to acquire the imaging information S5.

Step ST4 described above is a step of executing, using the camera 5, the imaging processing with at least a part of the mist flowing region where the mist-containing gas G3 flows set as the imaging target region to acquire the imaging information S5.

Note that the acquisition processing of the correlation parameter K1 in step ST2 described above may be executed after execution of step ST4 and before execution of step ST5.

Then, in step ST5, the mist flow rate calculation unit 16 executes mist flow rate calculation processing to calculate the mist flow rate MF. Hereinafter, the mist flow rate calculation processing is described in detail.

The mist flow rate calculation unit 16 first executes sum value calculation processing of obtaining the luminance sum value that is a sum of the plurality of luminance values indicated by the imaging information S5. Thereafter, the mist flow rate calculation unit 16 executes the flow rate derivation processing of deriving the mist flow rate MF from the luminance sum value obtained by the sum value calculation processing.

For example, when the luminance sum value obtained by the sum value calculation processing is denoted by LS, the mist flow rate MF can be obtained by the following Expression (1A) to which Expression (1) described above is applied.

$$MF = K1 \cdot LS + c1 \qquad (1A)$$

As described above, in the processing of step ST5, the mist flow rate calculation processing is executed, the processing obtaining the mist flow rate MF in the mist-containing gas G3 from the luminance sum value LS of the plurality of luminance values using the correlation parameter K1 based on the imaging information S5.

Therefore, the mist flow rate measuring apparatus of the first embodiment can measure the mist flow rate MF based on the imaging information S5 by executing the mist flow rate measuring method including steps ST1 to ST5. Note that for a unit of the mist flow rate MF, for example, (L (liter)/min) is possible.

The mist flow rate information S16 indicating the mist flow rate MF calculated by the mist flow rate calculation unit 16 is output to the flow rate control unit 17 of the next stage.

In step ST6, the flow rate control unit 17 of the ultrasonic atomization system 1001 executes raw material supply control processing of controlling a supply state of the raw material solution 15 supplied from the container 21 of the raw material solution supply unit 20 to the atomization container 1. Hereinafter, details of processing contents of step ST6 by the flow rate control unit 17 are described.

The flow rate control unit 17, which is the raw material supply control unit, receives the measured flow rate information S23 from the flow meter 23, and receives the mist flow rate information S16 from the mist flow rate calculation unit 16.

The flow rate control unit 17 constantly recognizes the flow rate of the raw material solution flowing through the raw material solution supply side pipe 24 by the measured flow rate indicated by the measured flow rate information S23.

The flow rate control unit 17 constantly recognizes the flow rate of the raw material mist 3 by the mist flow rate MF indicated by the mist flow rate information S16.

Based on the measured flow rate information S23 and the mist flow rate information S16, the flow rate control unit 17 executes the raw material supply control processing of outputting a pump drive signal S17 instructing a driving amount of the pump 22 so as to satisfy a flow rate control condition to be described later. The flow rate control condition is, for example, a condition that "the mist flow rate MF indicated by the mist flow rate information S16 is within an allowable range from a reference mist flow rate".

As described above, the flow rate control unit 17 recognizes the flow rate of the raw material mist 3 generated by the ultrasonic atomization apparatus 100 based on the mist flow rate information S16 obtained from the mist flow rate calculation unit 16, and executes the raw material supply control processing to make the recognized flow rate of the raw material mist 3 become the predetermined flow rate within the allowable range from the reference mist flow rate.

Figure 7:
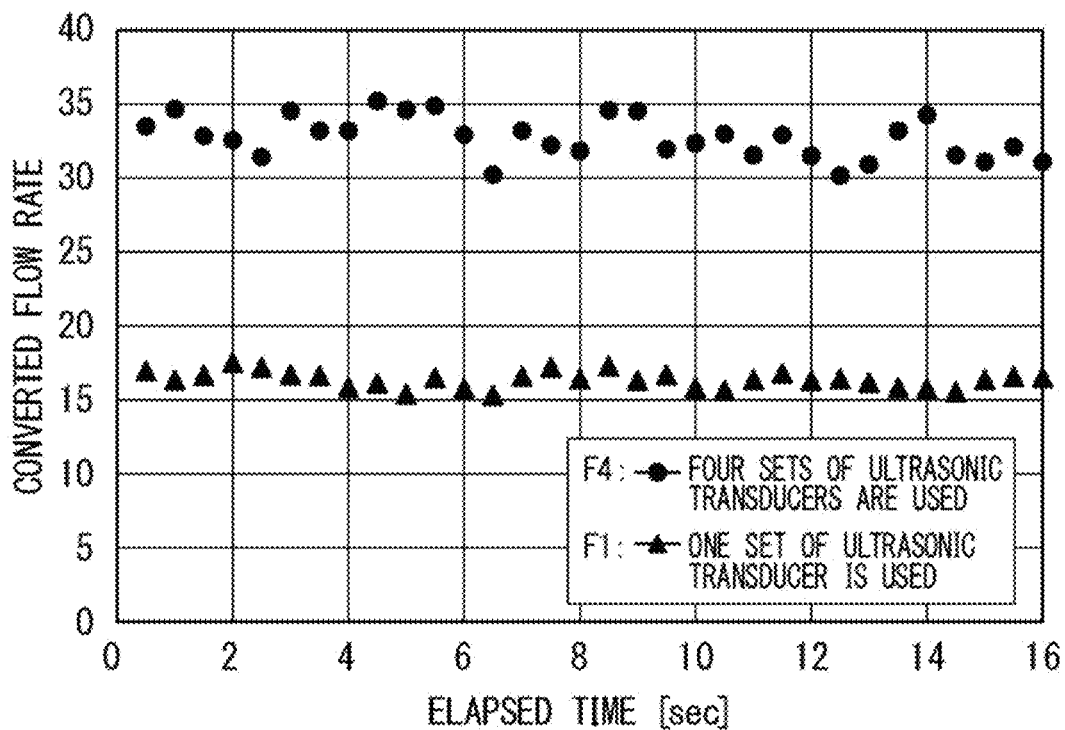
FIG. 7 is a graph showing an example of a measurement result of a mist flow rate by a mist flow rate measuring apparatus of the first embodiment.

FIG. 7 is a graph showing an example of a measurement result of the mist flow rate MF by the mist flow rate measuring apparatus of the first embodiment. In the drawing, the horizontal axis represents the elapsed time (sec), and the vertical axis represents the converted flow rate (value) (optional unit) based on the mist flow rate MF.

In the drawing, a converted flow rate F1 indicates a case where the ultrasonic vibration processing is executed by one ultrasonic transducer 2, and a converted flow rate F4 indicates a case where the ultrasonic vibration processing is executed by four ultrasonic transducers 2. As shown in the drawing, the converted flow rate F4 is larger than the converted flow rate F1, and the converted flow rate F1 and the converted flow rate F4 are each within a matching range, and it can be seen that the raw material supply control processing by the flow rate control unit 17 is appropriately executed.

The mist flow rate calculation unit 16 in the mist flow rate measuring apparatus of the first embodiment executes the mist flow rate calculation processing based on the imaging information S5 indicating the plurality of luminance values in the plurality of pixels corresponding to the imaging target region R5.

Because there is a certain correlation between the mist flow rate MF (the flow rate of the raw material mist 3) and the plurality of luminance values, the correlation parameter K1 for deriving the mist flow rate MF from the plurality of luminance values indicated by the imaging information S5 can be acquired in advance (see FIG. 5).

As a result, the mist flow rate measuring apparatus of the first embodiment can accurately obtain the mist flow rate MF by executing the mist flow rate calculation processing using the correlation parameter K1 based on the imaging information S5.

The camera 5, which is the mist imaging camera, can relatively easily obtain the imaging information S5 by executing the imaging processing of imaging the reflected light L2.

The mist flow rate calculation unit 16 can execute the mist flow rate calculation processing that is simple and highly accurate by guiding the mist flow rate MF from the luminance sum value.

The mist flow rate measuring apparatus of the first embodiment can execute the imaging processing by the camera 5 in a space in which the diffusion of the raw material mist 3 contained in the mist-containing gas G3 is suppressed, by providing the transparent pipe 10 serving as the imaging pipe having the flow path of the mist-containing gas G3 therein.

In addition, because the constituent material of the transparent pipe 10 has transparency, the presence of the transparent pipe 10 does not affect the imaging processing by the camera 5.

Because the transparent pipe 10 serving as the imaging pipe is disposed along the vertical direction (Z direction), the liquid condensed in the transparent pipe 10 can be discharged downward (—Z direction) in the vertical direction with respect to the transparent pipe 10 without being accumulated in the transparent pipe 10.

Therefore, the mist flow rate measuring apparatus of the first embodiment can execute the imaging processing by the camera 5 while minimizing the influence of the dew condensation in the transparent pipe 10.

On the other hand, in the case where the transparent pipe 10 is disposed in the horizontal direction, the liquid formed by condensation of the raw material mist 3 in the transparent pipe 10 accumulates in the lower side of the transparent pipe 10. In the mist flow rate measuring apparatus of the first embodiment, because the transparent pipe 10 is disposed along the vertical direction, the above-described phenomenon does not occur.

Because the constituent material of the pipe inner surface S10 of the transparent pipe 10 has hydrophilicity, even if the dew condensation occurs in the transparent pipe 10, it is possible to suppress a phenomenon in which the condensed liquid adheres to the pipe inner surface S10 of the transparent pipe 10 as a water droplet.

The flow rate control unit 17 (raw material supply control unit) in the ultrasonic atomization system 1001 of the first embodiment executes the raw material supply control processing based on the mist flow rate information S16 obtained from the mist flow rate calculation unit 16 to make the mist flow rate MF become a predetermined flow rate.

Therefore, the ultrasonic atomization system 1001 of the first embodiment can stabilize the mist flow rate MF generated from the ultrasonic atomization apparatus 100 at the predetermined flow rate over a long period of time.

In step ST5 (see FIG. 6) in the mist flow rate measuring method executed by the mist flow rate measuring apparatus of the first embodiment, the mist flow rate MF is obtained using the correlation parameter K1 based on the plurality of luminance values in the plurality of pixels corresponding to the imaging target region R5.

Because the mist flow rate MF and the plurality of luminance values have a certain correlation, the mist flow rate measuring method of the first embodiment can accurately obtain the mist flow rate MF by using the correlation parameter K1.

(Modification)

In the mist flow rate measuring apparatus of the first embodiment shown in FIGS. 1 to 7, the case of executing the imaging processing once by the camera 5 has been shown. However, a modification is possible in which the imaging processing by the camera 5 is executed a plurality of times in succession.

For example, in the case where the camera 5 has ability of executing the imaging processing at a rate of once every one second, the imaging processing can be performed 20 times by continuously operating the camera 5 for 20 seconds.

Figure 8:
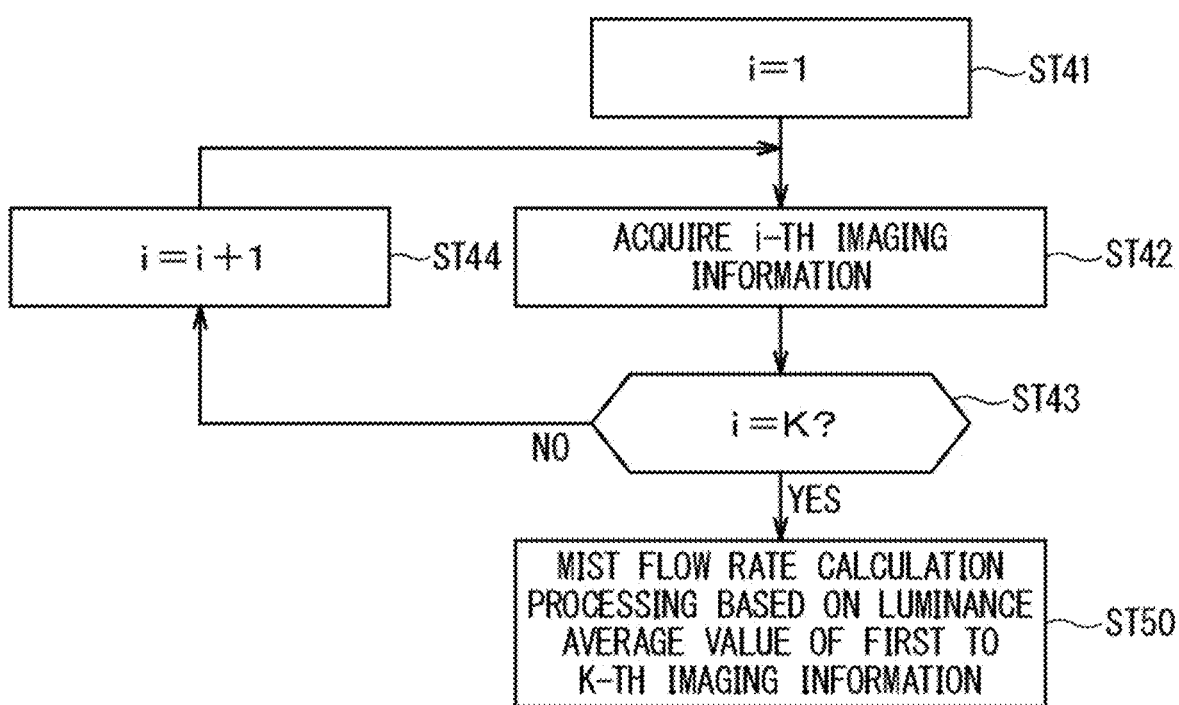
FIG. 8 is a flowchart showing imaging processing and mist flow rate calculation processing according to a modification of the first embodiment.

FIG. 8 is a flowchart showing the imaging processing and the mist flow rate calculation processing according to the modification of the mist flow rate measuring apparatus of the first embodiment.

In the drawing, processing of steps ST41 to ST44 corresponds to the processing of step ST4 in FIG. 6, and processing of step ST50 corresponds to the processing of step ST5 in FIG. 6. Note that the control shown in steps ST41 to ST44 in FIG. 8 is possibly executed, for example, under the control of the mist flow rate calculation unit 16 or by a control mechanism such as a CPU built in the camera 5. Furthermore, the example shown in FIG. 8 shows a case where the imaging processing is executed for K (≥2) times.

Referring to FIG. 8, in step ST41, a control parameter value i is initially set to {i=1}.

Then, in step ST42, first imaging processing by the camera 5 is executed, and the obtained imaging information S5 is acquired as first imaging information.

Thereafter, in step ST43, it is verified whether or not {i=K} holds for the control parameter value i. Here, if {i=K} (YES), the processing proceeds to step ST50, and if {i=K} is not satisfied (NO), the processing proceeds to step ST44.

In step ST44, the control parameter value i is increased by "1" {i=i+1}, and the processing returns to step ST42. Thereafter, the processing of steps ST42 to ST44 is repeated until it is determined as "YES" in step ST43.

When step ST43 is "YES", it means that the first to K-th imaging information (a plurality of pieces of imaging information) is obtained by executing the imaging processing K times (a plurality of times). Note that a mode can be used in which the camera 5 itself has a function of temporarily storing the first to K-th imaging information, or the mist flow rate calculation unit 16 is provided with the function.

In step ST50 executed when step ST43 is YES, the mist flow rate calculation unit 16 first executes the mist flow rate calculation processing based on the first to K-th imaging information. The first to K-th imaging information is a plurality of pieces of imaging information obtained by executing the imaging processing a plurality of times. Hereinafter, details of step ST50 are described.

First, the mist flow rate calculation unit 16 executes the sum value calculation processing on each of the first to K-th imaging information to obtain first to K-th luminance sum values LS(1) to LS(K) (a plurality of luminance sum values).

Subsequently, the mist flow rate calculation unit 16 obtains an average value of the luminance sum values LS(1) to LS(K) as a sum average value, and obtains the mist flow rate MF from the sum average value using the correlation parameter K1.

For example, assuming that the sum average value is MS, the mist flow rate MF can be obtained by the following Expression (1B) to which Expression (1) described above is applied.

$$MF=K1 \cdot MS+c1 \tag{1B}$$

As described above, in the flow rate derivation processing of the mist flow rate calculation unit 16, the mist flow rate MF is derived from the first to K-th luminance sum values LS(1) to LS(K). In the case of calculating the correlation parameter K1 in the modification, similarly to the actual operation of the mist flow rate measuring apparatus of the modification, it is desirable to calculate the correlation parameter K1 along the flow shown in FIG. 5 from the average value of the first to K-th luminance sum values LS(1) to LS(K).

In the modification of the first embodiment, by deriving the mist flow rate MF from the sum average value MS of the first to K-th luminance sum values LS(1) to LS(K), which are the plurality of luminance sum values, a more accurate mist flow rate MF can be obtained.

Second Embodiment

Figure 9:
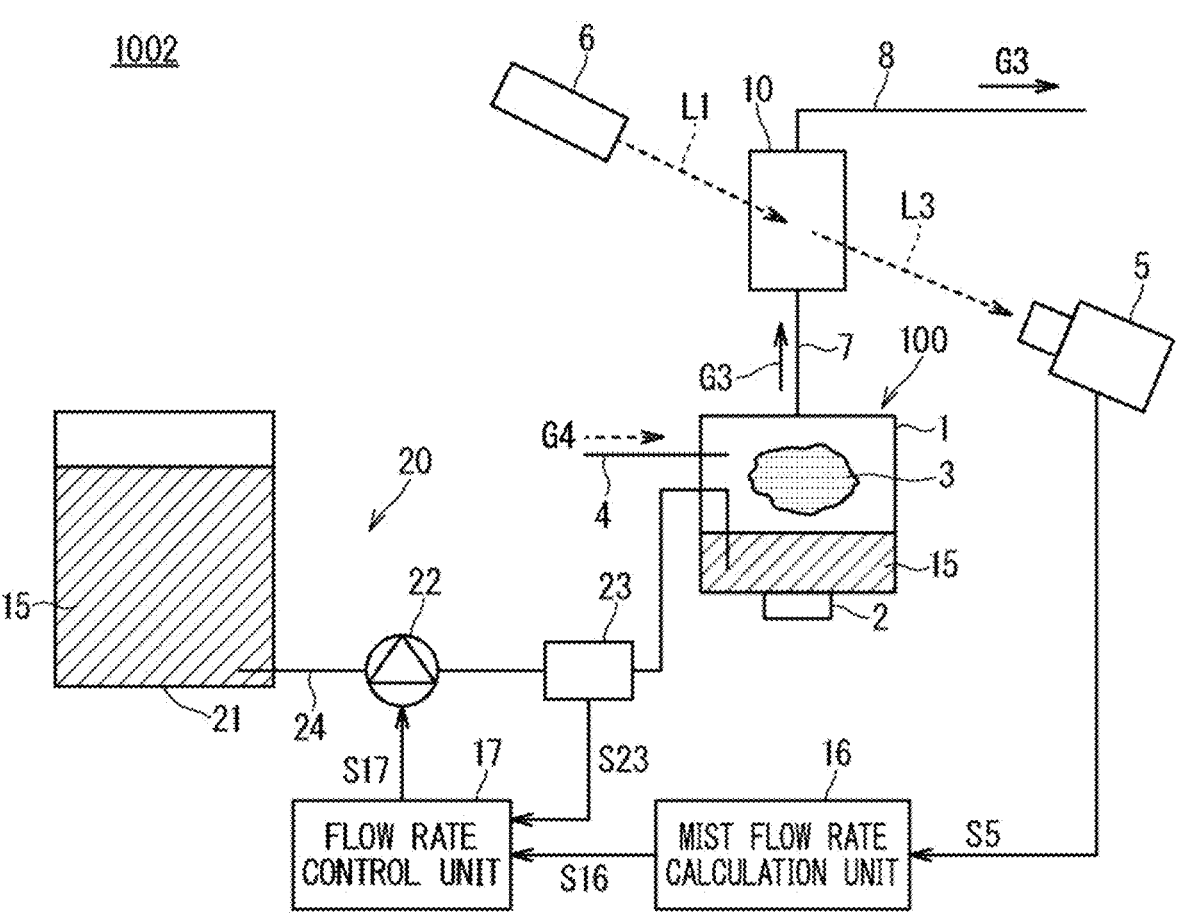
FIG. 9 is an explanatory view showing a configuration of an ultrasonic atomization system according to a second embodiment of the present disclosure.

FIG. 9 is an explanatory view showing a configuration of an ultrasonic atomization system 1002 according to a second embodiment of the present disclosure. The ultrasonic atomization system 1002 includes a mist flow rate measuring apparatus of the second embodiment. The mist flow rate measuring apparatus of the second embodiment includes a camera 5, a light source 6, a transparent pipe 10, and a mist flow rate calculation unit 16 as main constituent elements.

Hereinafter, the same constituent elements as those of the first embodiment are denoted by the same reference numerals to appropriately omit the description thereof, and feature portions of the second embodiment are mainly described.

As shown in FIG. 9, the ultrasonic atomization system 1002 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

As shown in FIG. 9, in the mist flow rate measuring apparatus of the second embodiment, a part of the mist flowing region in the transparent pipe 10, which is the imaging pipe, is the imaging target region of the camera 5 which is the mist imaging camera.

The light source 6 irradiates the imaging target region in the transparent pipe 10 with incident light L1. Then, the incident light L1 is transmitted through the imaging target region of a mist-containing gas G3, and transmitted light L3 is obtained.

The camera 5, which is the mist imaging camera, is arranged at a position facing the light source 6 with the transparent pipe 10 interposed therebetween, and executes the imaging processing of imaging the transmitted light L3. That is, the imaging processing by the camera 5 is imaging processing on the transmitted light L3, the processing having at least a part of the mist flowing region where the mist-containing gas G3 including a raw material mist 3 flows set as the imaging target region.

The camera 5 executes the imaging processing to acquire imaging information S5. The imaging information S5 includes a plurality of luminance values in a plurality of pixels corresponding to the imaging target region.

The mist flow rate calculation unit 16 in the mist flow rate measuring apparatus of the second embodiment executes the mist flow rate calculation processing based on the imaging information S5 indicating the plurality of luminance values obtained by the imaging processing on the transmitted light L3 by the camera 5.

As a result, similarly to the first embodiment, the mist flow rate measuring apparatus of the second embodiment can accurately obtain a mist flow rate MF by executing the mist flow rate calculation processing using a correlation parameter K1 based on the imaging information S5.

In addition, the camera 5, which is the mist imaging camera of the mist flow rate measuring apparatus of the second embodiment, can relatively easily obtain the imaging information S5 by executing the imaging processing of imaging the transmitted light L3.

Third Embodiment

Figure 10:
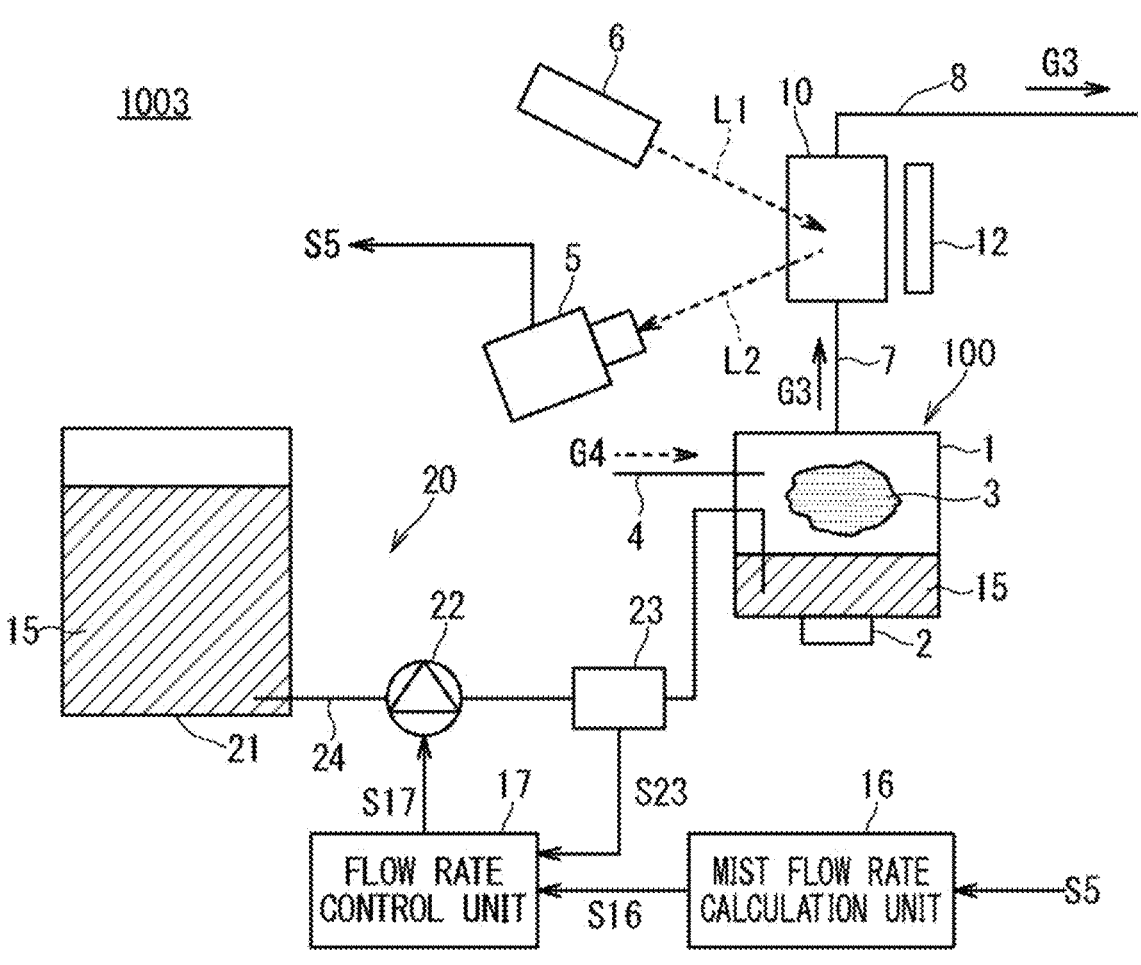
FIG. 10 is an explanatory view showing a configuration of an ultrasonic atomization system according to a third embodiment of the present disclosure.

FIG. 10 is an explanatory view showing a configuration of an ultrasonic atomization system 1003 according to a third embodiment of the present disclosure. The ultrasonic atomization system 1003 includes a mist flow rate measuring apparatus of the third embodiment. The mist flow rate measuring apparatus of the third embodiment includes a camera 5, a light source 6, a transparent pipe 10, a heater 12, and a mist flow rate calculation unit 16 as main constituent elements.

Hereinafter, the same constituent elements as those of the first embodiment are denoted by the same reference numerals to appropriately omit the description thereof, and feature portions of the third embodiment are mainly described.

As shown in FIG. 10, the ultrasonic atomization system 1003 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

As shown in FIG. 10, in the mist flow rate measuring apparatus of the third embodiment, the heater 12 is provided along the extending direction (Z direction) of the transparent pipe 10, which is an imaging pipe, in proximity to the transparent pipe 10. The heater 12 heats the transparent pipe 10 and the inside thereof.

Similarly to the first embodiment, the mist flow rate calculation unit 16 in the mist flow rate measuring apparatus of the third embodiment executes the mist flow rate calculation processing based on imaging information S5 indicating the plurality of luminance values corresponding to the imaging target region.

As a result, similarly to the first embodiment, the mist flow rate measuring apparatus of the third embodiment can accurately obtain a mist flow rate MF by executing the mist flow rate calculation processing using a correlation parameter K1 based on the imaging information S5.

In addition, the mist flow rate measuring apparatus of the third embodiment further includes the heater 12, and because the heater 12 can heat the transparent pipe 10, which is the imaging pipe, and the inside thereof, the generation of dew condensation in the transparent pipe 10 can be suppressed.

Fourth Embodiment

FIG. 11 is an explanatory view showing a configuration of an ultrasonic atomization system 1004 according to a fourth embodiment of the present disclosure. The ultrasonic atomization system 1004 includes a mist flow rate measuring apparatus of the fourth embodiment. The mist flow rate measuring apparatus of the fourth embodiment includes a light source 6, a transparent pipe 10, and a mist flow rate calculation unit 16, and cameras 51 and 52 as main constituent elements.

Hereinafter, the same constituent elements as those of the first embodiment are denoted by the same reference numerals to appropriately omit the description thereof, and feature portions of the fourth embodiment are mainly described.

As shown in FIG. 11, the ultrasonic atomization system 1004 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

In the mist flow rate measuring apparatus of the fourth embodiment, a part of the mist flowing region in the transparent pipe 10, which is the imaging pipe, is the imaging target region of the cameras 51 and 52, which is the mist imaging camera.

The light source 6 irradiates the imaging target region in the transparent pipe 10 with incident light L1. Then, the incident light L1 is reflected in the imaging target region of a mist-containing gas G3, and two beams of reflected light L21 and L22 (a plurality of the beams of reflected light) are obtained. The beams of reflected light L21 and L22 are reflected in different directions, and do not interfere with each other.

The cameras 51 and 52, which are a plurality of the mist imaging cameras, are arranged with respect to the beams of reflected light L21 and L22, which are a plurality of the beams of reflected light. The camera 51 executes the imaging processing of imaging the reflected light L21, and the camera 52 executes the imaging processing of imaging the reflected light L22.

As described above, the imaging processing by the cameras 51 and 52 is imaging processing on the beams of reflected light L21 and L22, the processing having at least a part of the mist flowing region where the mist-containing gas G3 including a raw material mist 3 flows set as the imaging target region.

The camera 51 executes the imaging processing on the reflected light L21 to acquire imaging information S51. The imaging information S51 indicates a plurality of luminance values in a plurality of pixels corresponding to the reflected light L21 from the imaging target region. The camera 52 executes the imaging processing on the reflected light L22 to acquire imaging information S52. The imaging information S52 indicates a plurality of luminance values in a plurality of pixels corresponding to the reflected light L22 from the imaging target region.

The beams of reflected light L21 and L22 do not interfere with each other, and the pieces of imaging information S51 and S52 as a plurality of types of imaging information indicate a plurality of luminance values having different contents.

The mist flow rate calculation unit 16 executes the mist flow rate calculation processing of obtaining the flow rate of the raw material mist 3 in the mist-containing gas G3 based on the pieces of imaging information S51 and S52, which are the plurality of types of imaging information, and obtains mist flow rate information S16 indicating the flow rate of the raw material mist 3.

The mist flow rate calculation processing includes the sum value calculation processing and the flow rate derivation processing described below.

Sum value calculation processing . . . Processing of obtaining a first luminance sum value which is a sum of the plurality of luminance values indicated by the imaging information S51 and a second luminance sum value which is a sum of the plurality of luminance values indicated by the imaging information S52, and obtaining an average value of the first and second luminance sum values as a luminance sum average value Flow rate derivation processing . . . Processing of deriving the flow rate of the raw material mist 3 from the luminance sum average value obtained by the sum value calculation processing For example, when the luminance sum average value obtained by the sum value calculation processing is denoted by LM, a mist flow rate MF can be obtained by a following Expression (1C) to which Expression (1) described above is applied.

$$MF = K1 \cdot LM + c1 \tag{1C}$$

As described above, the mist flow rate calculation unit 16 executes the mist flow rate calculation processing based on the plurality of luminance values respectively indicated by the pieces of imaging information S51 and S52. In the case of calculating a correlation parameter K1 in the fourth embodiment, similarly to the actual operation of the mist flow rate measuring apparatus of the fourth embodiment, it is desirable to calculate the correlation parameter K1 along the flow shown in FIG. 5 from the average value of the first and second luminance sum values.

The mist flow rate calculation unit 16 in the mist flow rate measuring apparatus of the fourth embodiment executes the mist flow rate calculation processing based on the pieces of imaging information S51 and S52 each indicating the plurality of luminance values.

As a result, similarly to the first embodiment, the mist flow rate measuring apparatus of the fourth embodiment can accurately obtain the mist flow rate MF by executing the mist flow rate calculation processing using the correlation parameter K1 based on the pieces of imaging information S51 and S52.

The mist flow rate calculation unit 16 executes the mist flow rate calculation processing based on the various pieces of imaging information S51 and S52 (plurality of types of imaging information) obtained from the cameras 51 and 52 which are the plurality of mist imaging cameras.

Therefore, the mist flow rate measuring apparatus of the fourth embodiment can more accurately obtain the flow rate of the raw material mist 3.

Although the mist flow rate calculation unit 16 of the fourth embodiment obtains the average value of the first and second luminance sum values is obtained when executing the sum value calculation processing, weighting may be performed between the first and second luminance sum values to make one ratio higher than the other ratio. For example, the ratio between the first luminance sum value and the second luminance sum value may be set to {2:1}.

In the fourth embodiment shown in FIG. 11, the configuration in which one light source 6 is provided has been described, but the number of the light sources 6 may be two so as to match the number of the cameras 51 and 52.

In addition, in the fourth embodiment, the two cameras 51 and 52 are shown as the plurality of mist imaging cameras, but three or more types of imaging information may be obtained using three or more mist imaging cameras.

Fifth Embodiment

Figure 12:
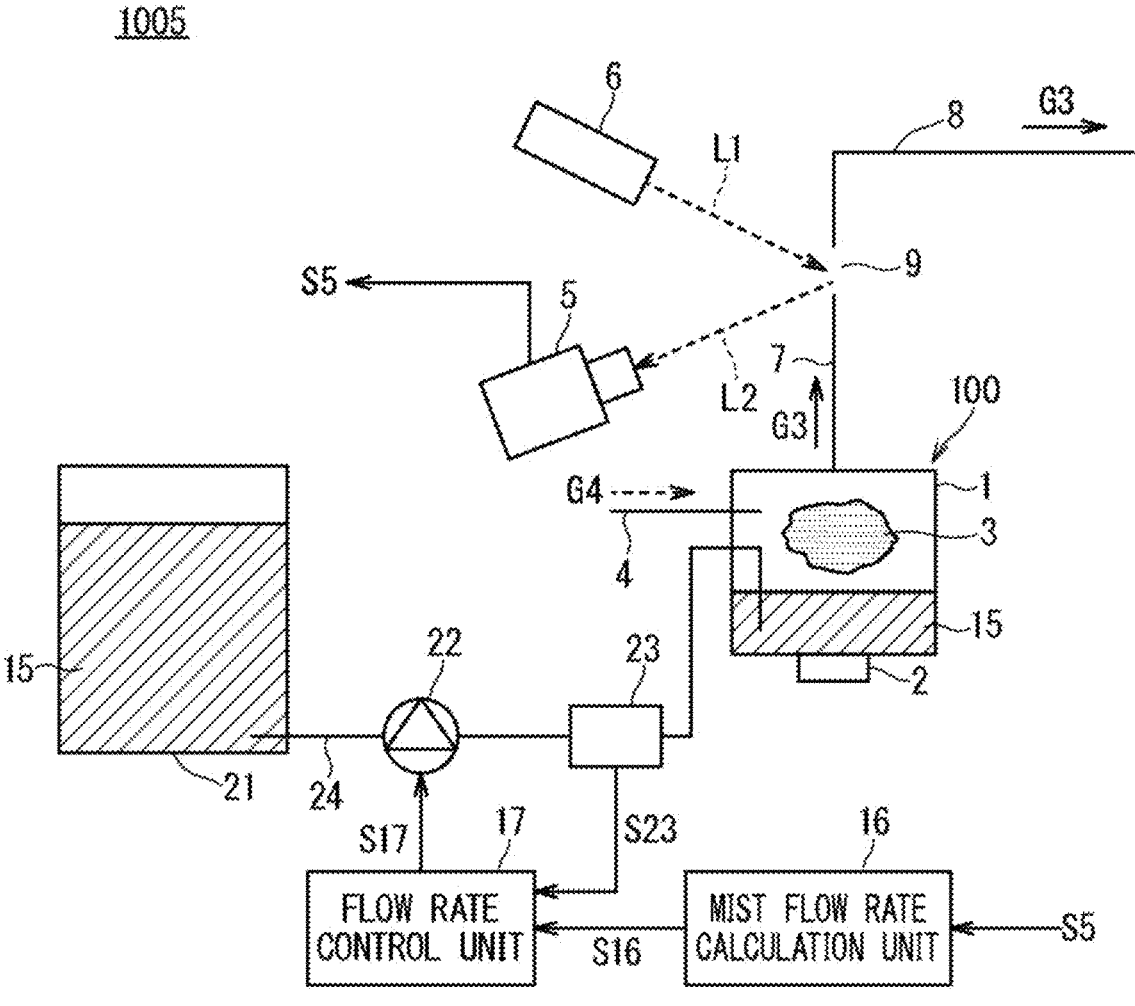
FIG. 12 is an explanatory view showing a configuration of an ultrasonic atomization system according to a fifth embodiment of the present disclosure.

FIG. 12 is an explanatory view showing a configuration of an ultrasonic atomization system 1005 according to a fifth embodiment of the present disclosure. The ultrasonic atomization system 1005 includes a mist flow rate measuring apparatus of the fifth embodiment. The mist flow rate measuring apparatus of the fifth embodiment includes a camera 5, a light source 6, an upstream pipe 7, a downstream pipe 8, a pipe absent space 9, and a mist flow rate calculation unit 16 as main constituent elements.

Hereinafter, the same constituent elements as those of the first embodiment are denoted by the same reference numerals to appropriately omit the description thereof, and feature portions of the fifth embodiment are mainly described.

As shown in FIG. 12, the ultrasonic atomization system 1005 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements.

The upstream pipe 7 and the downstream pipe 8 are disposed spaced apart from each other with the pipe absent space 9 interposed therebetween, and the combination of the upstream pipe 7 and the downstream pipe 8 constitutes an external discharge pipe for a mist-containing gas G3. The upstream pipe 7 serves as a first gas supply pipe, the downstream pipe 8 serves as a second gas supply pipe, and the pipe absent space 9 serves as a gap space.

In the fifth embodiment, the upstream pipe 7 (first gas supply pipe) and the downstream pipe 8 (second gas supply pipe) also function as main constituent elements essential for providing the pipe absent space 9 in the mist flow rate measuring apparatus.

As described above, a mist-containing gas G3 containing a raw material mist 3 is supplied to the outside from an atomization container 1 via the upstream pipe 7, the pipe absent space 9, and the downstream pipe 8.

Figure 13:
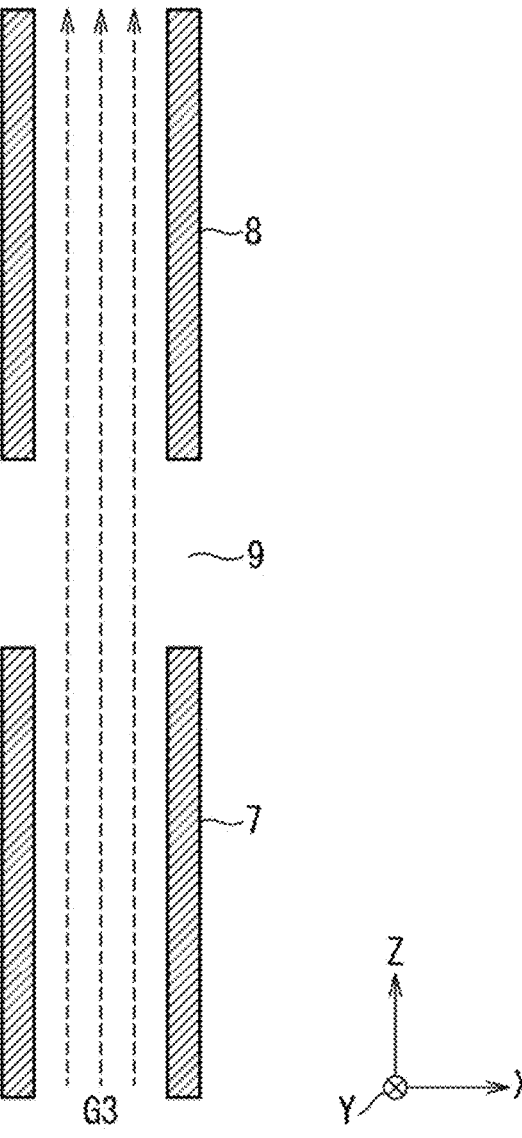
FIG. 13 is an explanatory view showing a cross-sectional structure of an upstream pipe and a downstream pipe shown in FIG. 12.
Figure 14:
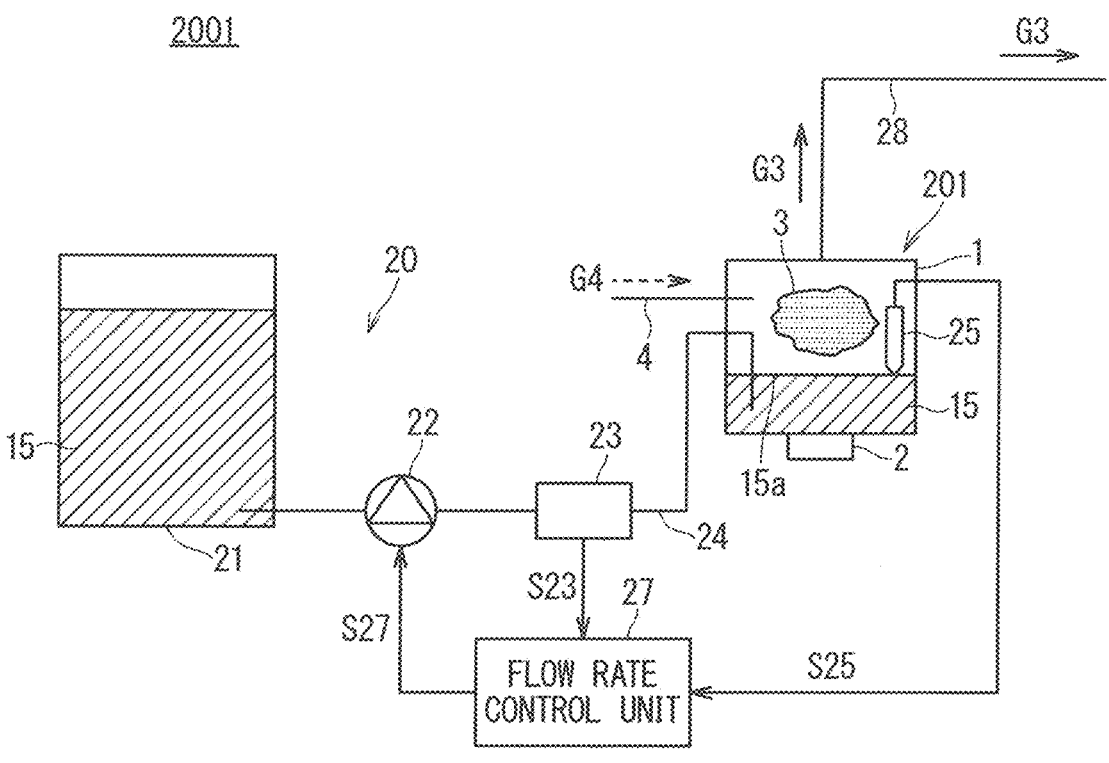
FIG. 14 is an explanatory view showing a configuration (part 1) of a conventional ultrasonic atomization system.

FIG. 13 is an explanatory view showing a cross-sectional structure of the upstream pipe 7 and the downstream pipe 8. In FIG. 13, an XYZ orthogonal coordinate system is shown.

As shown in FIG. 13, each of the upstream pipe 7 and the downstream pipe 8 serves as a flow path of the mist-containing gas G3 in the inside thereof. That is, each of the upstream pipe 7 and the downstream pipe 8 has the mist flowing region therein. Further, a pipe absent space 9 exists as the gap space between the upstream pipe 7 and the downstream pipe 8. The pipe absent space 9 also serves as the flow path of the mist-containing gas G3. That is, the pipe absent space 9 has the mist flowing region therein.

As shown in FIG. 13, the upstream pipe 7 and the downstream pipe 8 are disposed along the extending direction (+Z direction).

Because the mist-containing gas G3 is conveyed by a carrier gas G4 at a constant flow rate, the mist-containing gas G3 flowing from the upstream pipe 7 to the pipe absent space 9 flows into the downstream pipe 8 along the +Z direction without leaking to the outside from the pipe absent space 9.

In the mist flow rate measuring apparatus of the fifth embodiment, a part of the mist flowing region in the pipe absent space 9, which is the gap space, is the imaging target region of the camera 5 which is the mist imaging camera.

The light source 6 irradiates the imaging target region in the pipe absent space 9 with incident light L1. Then, the incident light L1 is reflected in the imaging target region of the mist-containing gas G3, and reflected light L2 is obtained.

Then, the camera 5, which is the mist imaging camera, executes imaging processing of imaging the reflected light L2.

The camera 5 executes the imaging processing to acquire imaging information S5. The imaging information S5 indicates a plurality of luminance values in a plurality of pixels corresponding to the imaging target region in the pipe absent space 9.

Similarly to the first embodiment, the mist flow rate calculation unit 16 in the mist flow rate measuring apparatus of the fifth embodiment executes the mist flow rate calculation processing based on the imaging information S5 indicating the plurality of luminance values.

As a result, similarly to the first embodiment, the mist flow rate measuring apparatus of the fifth embodiment can accurately obtain a mist flow rate MF by executing the mist flow rate calculation processing using a correlation parameter K1 based on the imaging information S5.

Because the imaging target region of the camera 5, which is the mist imaging camera, exists in the pipe absent space 9, which is the gap space, the camera 5 in the mist flow rate measuring apparatus of the fifth embodiment can accurately execute the imaging processing on the reflected light L2 without being affected by dew condensation at all.

<Others>

Although the present disclosure has been described in detail, the above description is illustrative in all aspects, and the present disclosure is not limited thereto. It is understood that countless modifications that are not illustrated can be envisaged without departing from the scope of the present disclosure.

It should be noted that in the present disclosure, each of the embodiments can be freely combined, and each of the embodiments can be appropriately modified and omitted, within the scope of the present disclosure.

For example, the heater 12 used in the third embodiment can be used in the second embodiment, the fourth embodiment, and the fifth embodiment, or the structure including the transparent pipe 10 in the second embodiment to the fourth embodiment can be changed to the structure including the pipe absent space 9 described in the fifth embodiment.

The invention claimed is:

1. A mist flow rate measuring apparatus comprising:
   a mist imaging camera that executes imaging processing with at least a part of a mist flowing region through which a mist-containing gas containing a raw material mist flows set as an imaging target region to acquire imaging information; and
   circuitry configured to execute mist flow rate calculation processing of obtaining a flow rate of the raw material mist in the mist-containing gas based on the imaging information,
   wherein the imaging information indicates a plurality of luminance values in a plurality of pixels corresponding to the imaging target region, wherein the mist flow rate calculation processing includes:

sum value calculation processing of obtaining a luminance sum value that is a sum of the plurality of luminance values indicated by the imaging information, and a flow rate derivation processing of deriving a flow rate of the raw material mist from the luminance sum value.

2. The mist flow rate measuring apparatus according to claim 1, further comprising:

a light source that irradiates the imaging target region with incident light, wherein the imaging processing executed by the mist imaging camera includes processing of imaging reflected light obtained by the incident light being reflected in the imaging target region.

3. The mist flow rate measuring apparatus according to claim 1, further comprising:

a light source that irradiates the imaging target region with incident light, wherein the imaging processing executed by the mist imaging camera includes processing of imaging transmitted light obtained by the incident light being transmitted through the imaging target region.

4. The mist flow rate measuring apparatus according to claim 1, wherein the imaging processing includes a plurality of times of imaging processing, the imaging information includes a plurality of pieces of imaging information obtained by executing the plurality of times of imaging processing, and the luminance sum value includes a plurality of luminance sum values, the circuitry executes the sum value calculation processing on each of the plurality of pieces of imaging information to obtain the plurality of luminance sum values, and the flow rate derivation processing derives a flow rate of the raw material mist from the plurality of luminance sum values.

5. The mist flow rate measuring apparatus according to claim 1, further comprising:

an imaging pipe having the mist flowing region inside, wherein the imaging pipe has a part of the mist flowing region in the imaging pipe provided as the imaging target region, and the imaging pipe is constituted of a material having transparency.

6. The mist flow rate measuring apparatus according to claim 5, wherein the imaging pipe is disposed along a vertical direction.

7. The mist flow rate measuring apparatus according to claim 5, further comprising:

a heater that heats the imaging pipe.

8. The mist flow rate measuring apparatus according to claim 5, wherein the imaging pipe has an inner surface that is constituted of the material having hydrophilicity.

9. The mist flow rate measuring apparatus according to claim 1, further comprising:

a first gas supply pipe and a second gas supply pipe, each of the first gas supply pipe and the second gas supply pipe having the mist flowing region inside, wherein the first gas supply pipe and the second gas supply pipe are provided with a gap space between the first gas supply pipe and the second gas supply pipe, the gap space has the mist flowing region inside, and the mist-containing gas flows between the first and second gas supply pipes through the gap space, and the gap space has a part of the mist flowing region in the gap space provided as the imaging target region.

10. The mist flow rate measuring apparatus according to claim 1, wherein the mist imaging camera includes a plurality of mist imaging cameras, the imaging information includes a plurality of types of imaging information corresponding to the plurality of mist imaging cameras, and the plurality of types of imaging information has different contents, and the circuitry executes the mist flow rate calculation processing based on the plurality of types of imaging information.

11. An ultrasonic atomization system comprising:

an ultrasonic atomization apparatus that generates a raw material mist by executing ultrasonic vibration processing on a raw material solution and causes a mist-containing gas containing the raw material mist to flow into a mist flowing region;

a raw material solution supplier that supplies the raw material solution to the ultrasonic atomization apparatus;

a raw material supply circuit that executes raw material supply control processing of controlling a supply state of the raw material solution supplied from the raw material solution supplier to the ultrasonic atomization apparatus;

a mist imaging camera that executes imaging processing with at least a part of the mist flowing region through which the mist-containing gas containing the raw material mist flows set as an imaging target region to acquire imaging information; and circuitry configured to execute mist flow rate calculation processing of obtaining a flow rate of the raw material mist in the mist-containing gas based on the imaging information, wherein the imaging information indicates a plurality of luminance values in a plurality of pixels corresponding to the imaging target region, wherein the circuitry outputs mist flow rate information indicating a flow rate of the raw material mist when the mist flow rate calculation processing is executed, and wherein the raw material supply circuit executes the raw material supply control processing based on the mist flow rate information to cause the flow rate of the raw material mist to become a predetermined flow rate.

12. A mist flow rate measuring method comprising:

(a) executing, using a mist imaging camera, imaging processing with at least a part of a mist flowing region through which a mist-containing gas containing a raw material mist flows set as an imaging target region to acquire imaging information, the imaging information indicating a plurality of luminance values in a plurality of pixels corresponding to the imaging target region;

(b) acquiring a correlation parameter from the plurality of luminance values, the correlation parameter being used to derive a flow rate of the raw material mist; and (c) based on the imaging information and using the correlation parameter, executing mist flow rate calculation processing of obtaining a flow rate of the raw material mist in the mist-containing gas from the plurality of luminance values.

\* \* \* \* \*